United States Patent [19]
Nair et al.

[11] Patent Number: 4,965,131
[45] Date of Patent: Oct. 23, 1990

[54] COLLOIDALLY STABILIZED SUSPENSION PROCESS

[75] Inventors: Mridula Nair, Penfield; Zona R. Pierce; Donna A. DiPrima, both of Rochester, all of N.Y.

[73] Assignee: Eastman Kodak Company, Rochester, N.Y.

[21] Appl. No.: 170,519

[22] Filed: Mar. 21, 1988

[51] Int. Cl.$^5$ .................... B32B 27/14; G03G 5/00
[52] U.S. Cl. .................... 428/407; 428/403; 430/137
[58] Field of Search .................... 427/222, 213.3; 428/407, 403; 430/137, 108, 109, 111

[56] References Cited

U.S. PATENT DOCUMENTS

| | | | |
|---|---|---|---|
| 2,932,629 | 4/1960 | Wiley | 526/226 |
| 4,138,383 | 2/1979 | Rembaum et al. | 524/809 |
| 4,148,741 | 4/1979 | Bayley | 430/137 |
| 4,601,968 | 7/1986 | Hyosu | 430/137 |
| 4,680,200 | 7/1987 | Solc | 427/213.34 |
| 4,708,923 | 11/1987 | Myers, Jr. et al. | 430/112 |
| 4,833,060 | 5/1989 | Nair et al. | 430/137 |

FOREIGN PATENT DOCUMENTS

| | | |
|---|---|---|
| 61-91666 | 5/1986 | Japan . |
| 8701828 | 3/1987 | PCT Int'l Appl. . |

*Primary Examiner*—George F. Lesmes
*Assistant Examiner*—Christopher Brown
*Attorney, Agent, or Firm*—Alfred P. Lorenzo

[57] ABSTRACT

A method of preparing polymer particles having narrow size distribution in a suspension process employing a solid colloidal stabilizing agent. The solid colloidal stabilizer is a copolymer of about 25 to about 80% by weight, based on total monomer weight, of an additional polymerizable nonionic oleophilic monomer, about 5 to about 45%, by weight, of an addition polymerizable nonionic hydrophilic monomer, about 1 to about 50% of an addition polymerizable ionic monomer, and 0 to about 20 percent, by weight, of a cross-linking monomer having at least two addition polymerizable groups. Also disclosed are polymeric particles comprising a core polymer covered by a layer of the smaller copolymer stabilizer particles and electrostatographic toners comprising such polymeric particles.

9 Claims, 2 Drawing Sheets

COLLOIDALLY STABILIZED SUSPENSION PROCESS

TECHNICAL FIELD

This invention relates to a colloidally stabilized suspension process for producing polymer particles of narrow size distribution, polymers prepared by the process and electrostatographic toners containing such polymers. In particular, it relates to the use of a copolymer of at least three different monomers as a solid colloidal stabilizer in the aforementioned process.

BACKGROUND ART

There are many applications for powdered polymeric particles where it is important that the particles have a narrow size distribution. One such application is where the particles are used as electrostatographic toners. In such toners the particles can function, for example, as the sole toner component to form toner images or as binders for other toner addenda such as colorants and charge control agents. The electrostatographic toners are in the form of particles that are subject to electrostatic forces and other forces that affect the particles differently depending on their size, and, in order to obtain good copies, it is necessary that all of the particles be affected in substantially the same way in the copying process. This means that the particles must have a narrow size distribution. While there are many processes that produce polymer particles, few produce such particles having a narrow size distribution. If the particles do not have a narrow size distribution, it may be necessary to size them by passing the particles through sieves. This is an expensive process which significantly adds to the cost of the electrostatographic toner.

A well-known process that provides polymer particles having a narrow size distribution employs a solid colloidal stabilizer to control both particle size and particle size distribution. One example of this type of process is described in U.S. Pat. Nos. 2,932,629 and 4,148,741, which pertain to a suspension polymerization process where a solid colloidal stabilizer such as silica is used to limit the coalescence of droplets containing polymerizable monomer in an aqueous medium. In that process, a water-immiscible polymerizable liquid is sheared to form small droplets suspended in aqueous medium containing a water dispersible water-insoluble solid colloid such as silica as the suspension stabilizer. The concentration and size of the colloid determines the size of the droplets. The colloid performs this function by adhering to the droplets at the water/monomer interface to form a layer on the surface of the droplets. After monomer droplets have coalesced with other droplets and have grown to a particular diameter, the presence of the layer of colloidal stabilizer particles on the surface of the droplets prevents them from further coalescing and increasing in diameter. In this way, all of the droplets tend to grow to approximately the same diameter, so that upon polymerization the resulting polymer particles have a narrow size distribution.

A second example of a process that provides polymer particles having a narrow size distribution using a solid colloidal stabilizer comprises forming a solution of polymer in a solvent that is immiscible with water, dispersing the polymer/solvent solution in an aqueous medium containing silica as the solid colloidal stabilizer, removing the solvent, dehydrating and drying the resulting particles. For ease in distinguishing this type of process from the aforementioned "suspension polymerization" process, it is referred to hereinafter as the "polymer suspension" process. This type of process is described in copending U.S. application Ser. No. 171,065, filed Mar. 21, 1988 in the name of Nair, Pierce and Sreekumar, titled "Polymeric Powders Having A Predetermined and Controlled Size and Size Distribution", and assigned to the same assignee as this application, (now U.S. Pat. No. 4,833,060, issued May 23, 1989) and herein incorporated by reference.

The use of solid colloidal stabilizers such as silica to control particle size and size distribution of the resulting polymers has some disadvantages. For example, such solid colloidal particles can impart surface characteristics to the polymers that are incompatible with the intended use. Thus, if silica is used as the colloidal stabilizer in the preparation of polymer particles for use as electrostatographic toners it must be removed from the particles because silica adversely affects the triboelectric properties and the fixing characteristics of the toner. The removal of silica from the polymer particles requires several additional processing steps that significantly add to the cost of the toner. Furthermore, stabilizers such as silica have a constant composition and, therefore, the surface characteristics of polymer particles coated with such stabilizers cannot be changed. It would be advantageous to use a solid colloidal stabilizer whose composition can be varied so that the surface characteristics of polymer particles prepared using the stabilizer could be tailored to meet specific requirements. This would be particularly advantageous in the preparation of polymer particles for use in electrostatographic toners where it is often necessary to tailor the surface characteristics of the toner to achieve optimal performance upon fixing or transfer of the toner particles. Moreover, solid colloidal stabilizers such as silica require the use of promoters to drive them to the interface between the droplets and the aqueous medium. The use of a solid colloidal stabilizer that would not require such a promoter would greatly simplify the process in which the stabilizer is used.

It is, therefore, evident that there is a need for a suspension process that uses a solid colloidal stabilizer in preparing polymeric particles which stabilizer is not subject to the disadvantages described previously herein. It is also evident that there is a need for polymeric particles that can be prepared in suspension processes and have surface characteristics that are tailored to specific end uses, e.g., as electrostatographic toners. This invention meets these needs.

SUMMARY OF THE INVENTION

In accordance with this invention, a solid copolymer of certain monomers copolymerized in particular proportions is used as the solid colloidal stabilizer for polymer or polymerizable monomer droplets suspended in an aqueous medium. This copolymer limits the coalescence of the droplets to provide polymer particles having a narrow size distribution. Accordingly, this invention provides a method of preparing polymer particles which comprises forming a suspension of polymer droplets in an aqueous medium and forming a layer of solid colloidal stabilizer on the surface of the droplets to control the size and size distribution of the polymer particles. The stabilizer comprises a copolymer of (1) about 25 to about 80 percent by weight, based on total monomer weight, of an addition polymerizable nonionic oleophilic monomer;

(2) about 5 to about 45 percent by weight, based on total monomer weight, of an addition polymerizable nonionic hydrophilic monomer;

(3) about 1 to about 50 percent by weight, based on total monomer weight, of an addition polymerizable ionic monomer; and (4) 0 to about 20 percent by weight based on total monomer weight, of a crosslinking monomer having at least two addition polymerizable groups.

Although the two suspension processes described in the "Background Art" for forming polymeric particles having a narrow size distribution differ in the materials used initially to form the suspended droplets (polymerizable monomer in the "suspension polymerization" process set forth as the first example and preformed polymer in the "polymer suspension" process set forth as the second example); they do have in common the steps of forming a suspension of polymer droplets in an aqueous medium and forming a layer of solid colloidal stabilizer on the surface of the droplets to control the size and size distribution of the polymer particles made in the process. Accordingly, terminology referring to these common steps is used in the specification and claims of this application to include both of the aforementioned processes.

This invention also provides polymer particles having a core of polymer coated with a layer of smaller particles comprising the copolymer used as the solid colloidal stabilizer in this invention.

This invention also provides an electrostatographic toner comprising such copolymer particles.

BRIEF DESCRIPTION OF DRAWINGS

In FIG. 1, the polymer particle 1 comprises a core of polymer 2 having on its surface 3 a layer of smaller copolymer particles 4 that were used as the colloidal stabilizer in the preparation of the polymer particles according to this invention.

DETAILED DESCRIPTION OF THE INVENTION

Figure 1:
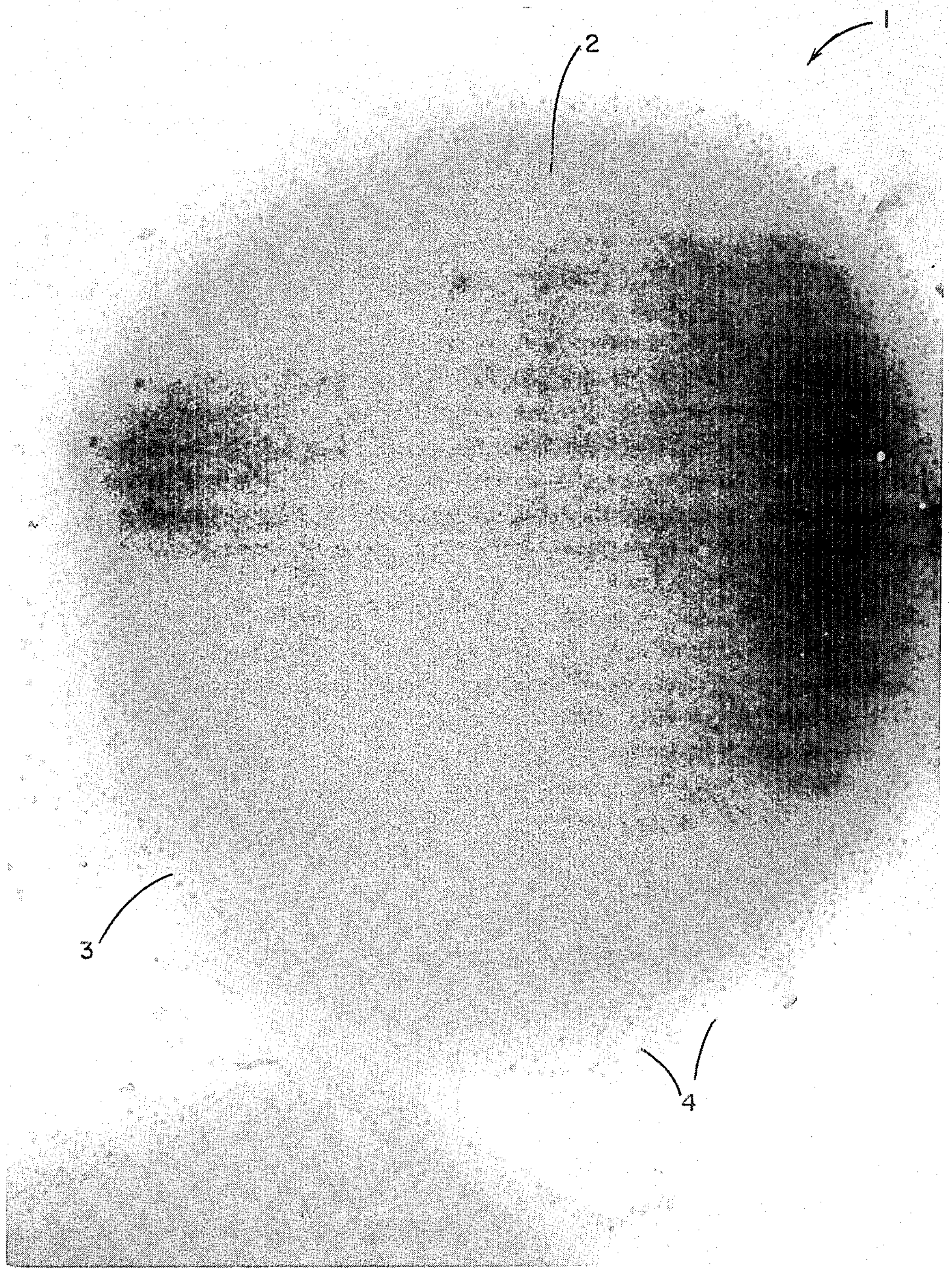
FIG. 1 is a scanning electron micrograph at an enlargement of 14,000× showing a dry polymer particle of this invention, prepared as described in Example 1.
Figure 2:
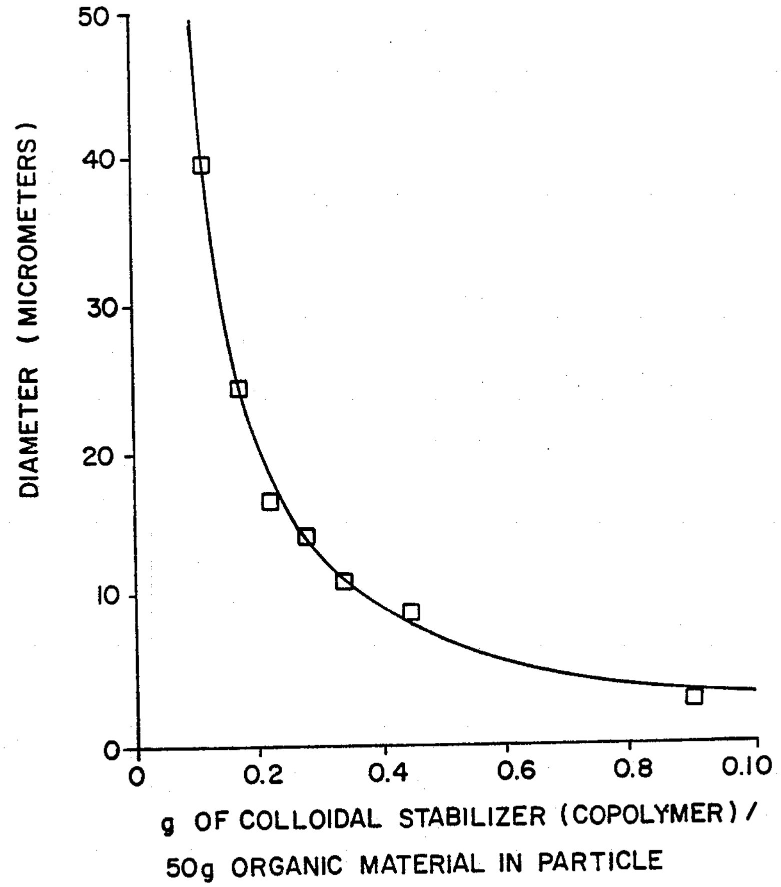
FIG. 2 is a graph that plots the relationship between the concentration of colloidal copolymer stabilizer used and the diameter of the resulting polymer particles obtained in several runs made according to this invention (designated by the symbol □), and shows that as the colloid stabilizer concentration (in grams of stabilizer per 50 grams of organic material in the polymer particles) increases the diameter of the polymer particle decreases.

The colloidal copolymer stabilizers used in this invention are copolymers of at least three different addition polymerizable monomers; about 25 to about 80%, by weight, (based on total monomer weight) of a nonionic oleophilic monomer, about 5 to about 45%, by weight, of a nonionic hydrophilic monomer, about 1 to about 50%, by weight, of an ionic monomer, and 0 to about 20%, by weight, of a crosslinking monomer having at least two addition polymerizable groups. Preferably, the copolymer is the reaction product of about 35 to about 65%, by weight, of the oleophilic monomer, about 10 to about 35%, by weight, of the hydrophilic monomer, about 1 to about 50%, by weight, of the ionic monomer, and about 5 to about 15%, by weight, of the crosslinking monomer.

As with conventional solid colloid stabilizers, the hydrophilic hydrophobic balance in the copolymers used in this invention is important since such a stabilizer must collect within the aqueous medium at the interface with the suspended droplet. The proper balance can be achieved in a specific situation by appropriate selection of monomers and their amount in the copolymer stabilizer, within those specified hereinbefore. If less oleophilic monomer is used the copolymer does not attach to the surface of the suspension droplet, and if more is used the copolymer can enter the droplet instead of staying on its surface. If less hydrophilic monomer is used the copolymer can enter the droplet and not remain on its surface, and if more is used the copolymer can stay in the water and not attach to the droplet. If less ionic monomer is used the droplets can coalesce to form an unstable suspension, and if more is used the copolymer can remain in the water and not attach to the surface of the droplets. The crosslinking monomer can be omitted if the copolymer is insoluble in the suspension droplets, but if a copolymer which is soluble in the droplet is used, some crosslinking monomer is needed to prevent the copolymer from dissolving in the suspended droplet to form an unstable suspension. If too much crosslinking monomer is present. however, the copolymer can not attach to the surface of the droplets to stabilize the suspension. Using the teachings of this specification in light of known prior art such as U.S. Pat. Nos. 2,932,629 and 4,148,741, referred to previously herein; one skilled in the art can readily determine the copolymer or class of copolymers having the hydrophilic-hydrophobic balance best suited for use as a colloidal stabilizer in a particular suspension process.

The monomers used in forming the stabilizers used in this invention are addition polymerizable and include monomers containing ethylenic unsaturation or more specifically vinylic, acrylic and/or allylic groups. Examples of suitable nonionic oleophilic monomers include, n-pentyl acrylate, n-butyl acrylate, benzyl acrylate, t-butyl methacrylate, 1,1-dihydroperfluorobutyl acrylate, benzyl methacrylate, m- and p-chloromethylstyrene, butadiene, 2-chloroethyl methacrylate, ethyl methacrylate, isobutyl acrylate, 2-ethylhexyl acrylate, 2-ethylhexyl methacrylate, chloroprene, n-butyl methacrylate, isobutyl methacrylate, isopropyl methacrylate, lauryl acrylate, lauryl methacrylate, methyl acrylate, methyl methacrylate, 2-ethoxyethyl acrylate, 2-ethoxyethyl methacrylate, 2-cyanoethyl acrylate, phenyl acrylate, isopropyl acrylate, n-propyl methacrylate, n-hexyl acrylate, styrene, sec-butyl acrylate, p-t-butylstyrene, N-t-butylacrylamide, vinyl acetate, vinyl bromide, vinylidene bromide, vinyl chloride, m- and p-vinyltoluene, α-methylstyrene, methyl p-styrenesulfonate, vinylbenzyl acetate and vinyl benzoate.

Examples of suitable nonionic hydrophilic monomers that are useful for making the copolymer stabilizers used in this invention include, for example, acrylamide, allyl alcohol, n-(isobutoxymethyl)acrylamide, N-(isobutoxymethyl)methacrylamide, m- and p-vinylbenzyl alcohol, cyanomethyl methacrylate, 2-poly(ethyleneoxy)ethyl acrylate, methacryloyloxypolyglycerol, glyceryl methacrylate, 2-hydroxyethyl acrylate, 2-hydroxypropyl acrylate, n-isopropylacrylamide, 2-methyl-1-vinylimidazole, 1-vinylimidazole, methacrylamide, 2-hydroxyethyl methacrylate, methacryloylurea, acrylonitrile, methacrylonitrile, N-acryloylpiperidine, 2-hydroxypropyl methacrylate, N-vinyl-2-pyrrolidone, p-aminostyrene, N,N-dimethylmethacrylamide, N-methylacrylamide, 2-methyl-5-vinylpyridine, 2-vinylpyridine, 4-vinylpyridine, N-isopropylmethacrylamide, N,N-dimethylacrylamide, 2-(diethylamino)ethyl acrylate, 2-(dimethylamino)ethyl acrylate, 2-(dimethylamino)ethyl methacrylate, and 2-(diethylamino)ethyl methacrylate. Such hydrophilic monomers are well known in the art and are generally considered to be monomers that can be mixed in an excess of water, e.g., a minimum of 2 grams of monomer in 100 grams of water, at 25° C. to form homogeneous solutions or dispersions in the absence of a stabilizing agent. Such a solution or dispersion has a substantially uniform composition throughout. In contrast, the oleophilic monomers previously described herein fail to meet these criteria.

Suitable ionic monomers that can be used in the copolymer stabilizers include both anionic and cationic monomers that dissociates in water at the pH at which the copolymer is prepared. Examples of such anionic monomers are aconitic acid, acrylic acid, methacrylic acid, fumaric acid, itaconic acid, maleic acid, 2-methacryloyloxyethylsulfuric acid, sodium salt, pyridinium 2-methacryloyloxyethylsulfate, 3-acrylamidopropane-1-sulfonic acid, potassium salt, p-styrenesulfonic acid, sodium salt, 3-methacryloyloxypropane-1-sulfonic acid, sodium salt, 2-acrylamido-2-methylpropanesulfonic acid, methacrylic acid, sodium salt, lithium methacrylate, 2-methacryloyloxyethyl 1 sulfonic acid ammonium p-styrenesulfonate, and sodium o- and p-styrenesulfonate. Examples of suitable cationic monomers include, for example, N-(3-acrylamidopropyl)ammonium methacrylate, N-(2-methacryloyloxyethyl)-N,N,N-trimethylammonium iodide, N-(2-methacryloyloxyethyl)-N,N,N-trimethylammonium p-toluenesulfonate, 1,2-dimethyl-5-vinylpyridinium methosulfate, N-(2-methacryloyloxyethyl)-N,N,N-trimethylammonium bromide, N-(2-methacryloyloxyethyl)-N,N,N-trimethylammonium fluoride, N-vinylbenzyl-N,N,N-trimethylammonium chloride, 3-methyl-1-vinylimidazolium methosulfate, N-(3-methacrylamidopropyl)-N-benzyl-N,N-dimethylammonium chloride, and N-(3-methacrylamidopropyl-N,N,N-trimethylammonium chloride.

Suitable crosslinking monomers useful for making the copolymer stabilizers used in this invention include, for example, N,N'-methylenebisacrylamide, ethylene dimethacrylate, 2,2-dimethyl-1,3-propylene diacrylate, divinylbenzene, N,N'-bis(methacryloyl)urea, 4,4'-isoproylidenediphenylene diacrylate, 1,3-butylene diacrylate, 1,4-cyclohexylenedimethylene dimethacrylate, ethylene diacrylate, ethylidene diacrylate, 1,6-diacrylamidohexane, 1,6-hexamethylene diacrylate, 1,6-hexamethylene dimethacrylate, tetramethylene dimethacrylate, ethylenebis(oxyethylene)diacrylate, ethylenebis(oxyethylene)dimethacrylate, ethylidyne trimethacrylate and 2-crotonoyloxyethyl methacrylate.

The copolymer stabilizers used in this invention are conveniently prepared by conventional aqueous emulsion polymerization processes, although other methods of preparation known to those skilled in the art may also be feasible. In such an emulsion polymerization process, the various monomers necessary to form the desired copolymer, together with minor amounts of ingredients such as polymerization initiators, and a surfactant or emulsifying agent are added to water. In addition to the monomers, a typical polymerization mixture can include, for example, about 35 to about 97% by weight, water. The amount of water, to some extent, determines the size oF the copolymer particles in that less water tends to result in larger size particles. A water soluble free radical initiator, typically about 0.1 to about 10%, by weight, (based on total monomer weight), and preferably about 0.5 to about 5%, is used to initiate the polymerization. Examples of suitable initiators include redox systems comprising persulfates such as potassium persulfate or ammonium persulfate and a bisulfite such as sodium bisulfite or potassium bisulfite. Free radical initiators, e.g., azo compounds such as 4,4'-azobis(4-cyanovaleric acid) 2,2'-azobis(2-amidinopropane)hydrochloride or 2,2'-azobis(2-methylpropanesulfonate) and peroxides such as benzoyl peroxide can be used. The polymerization mixture also typically contains a surface active agent such as sodium dodecyl sulfate, octylphenoxypolyethoxy ethanol, sodium lauryl sulfate sodium stearate and similar materials. Such surface active agents disperse the polymerizable monomers in the aqueous medium and concentrations are normally in the range of about 0.01 to about 0.5 parts, by weight, based on polymerization mixture.

In a typical emulsion polymerization process, the water is degassed with an inert gas such as argon or nitrogen, to remove oxygen, and the surfactant and a mixture of the monomers is added to the water. The initiator is added and the mixture is heated at about 80° to 90° C. for about 1 to 3 hours. The polymerization is complete when the monomer concentration, which can be monitored, diminishes to nearly zero. The pH is adjusted to about 7 to facilitate removal of the surfactant and the copolymer particles are stirred with a mixed bed ion exchange resin which removes surfactant.

The resulting copolymers typically have average diameters (swollen, in water) in the range of about 0.01 to about 1.0 micrometer, often about 0.01 to about 0.15 micrometer. The copolymers are solid colloidal materials that are insoluble but dispersible in water and function as excellent stabilizers for the process of this invention. It is convenient to use them in such processes in the form of aqueous latexes.

The copolymer stabilizers used in this invention perform their function of stabilizing the aqueous suspension of droplets without additional stabilizers. The copolymer is a third phase because it is insoluble in both the aqueous phase and in the suspended droplets. They are also non-dispersible in the droplets, but wettable by the droplets. They are more hydrophilic than oleophilic, and more hydrophilic than the droplets, so that they remain at the interface of the aqueous phase and the suspended droplets. The copolymer stabilizer particles uniformly cover the surface of the suspended droplets forming a layer on the polymer particles formed in the process. As shown in FIG. 1, the polymer particles comprise a core polymer covered by a layer of the smaller copolymer stabilizer particles. This layer provides a hydrophilic surface which covers the hydrophobic surface of the core polymer.

The method of this invention for the preparation of polymer particles encompasses the "suspension polymerization" technique wherein polymerizable monomer or monomers are added to an aqueous medium containing a particulate suspension of solid stabilizer of colloidal size. This mixture is agitated under shearing forces to reduce the size of the droplets. During this time an equilibrium is reached and the size of the droplets is stabilized by the action of the colloidal stabilizer in coating the surface of the droplets. Polymerization is completed to form an aqueous suspension of polymer particles in an aqueous phase having a layer of solid particulate colloid stabilizer on the surface of the polymer particles.

The method of this invention also encompasses the "polymer suspension" technique where solid stabilizers of colloidal size are used to limit the coalescence of suspended droplets formed from polymers dissolved in a solvent. Solutions of the polymers are dispersed as fine water-immiscible liquid droplets in water which contains the colloidal stabilizer. The suspension is stabilized by limiting the coalescence of the droplets as the solvent evaporates. Additional description of this type of process can be found in copending U.S. application Ser. No. 171,065, filed Mar. 21, 1988 in the name of Nair, Pierce and Sreekumar, now U.S. Pat. No. 4,833,060, issued May 23, 1989, and previously referenced herein. In the process of this invention a copolymer is used as the stabilizer without additional promoter rather than silica with a promoter as in the referenced application, but the process parameters of the referenced application are relevant.

In practicing this invention using the "suspension polymerization" technique, suitable monomers include for example, styrene, p-chlorostyrene; vinyl naphthalene; ethylenically unsaturated mono olefins such as ethylene, propylene, butylene and isobutylene; vinyl halides such as vinyl chloride, vinyl bromide, vinyl fluoride, vinyl acetate, vinyl propionate, vinyl benzoate and vinyl butyrate; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alphachloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidene; and mixtures thereof.

If desired, a chain transfer agent or crosslinking agent can be used in the "suspension polymerization" technique to modify the polymeric particles formed and produce particularly desired properties. Typical crosslinking agents are aromatic divinyl compounds such as divinylbenzene, divinylnaphthalene or derivatives thereof; diethylenecarboxylate esters such as diethylene methacrylate, diethylene acrylate; and other divinyl compounds such as divinyl sulfide or divinyl sulfone compounds.

In the "suspension polymerization" technique a catalyst or initiator which is compatible with the particular monomer or monomers used may be utilized. Typical initiators for polymerization are the peroxide and azo initiators. Among those found suitable for use in the process of this invention are 2,2'-azobis(2,4-dimethyl valeronitrile), lauroyl peroxide and the like which result in complete polymerization without leaving detrimental residual materials or requiring very high temperatures or pressures. Chain transfer and crosslinking agents can be added to the monomer to aid in polymerization and control the properties of the particle formed.

Polymers or mixture of polymers that can be used as starting materials using the "polymer suspension" technique in accordance with this invention, include for example, olefin homopolymers and copolymers, such as polyethylene, polypropylene, polyisobutylene, and polyisopentylene; polyfluoroolefins such as polytetrafluoroethylene; polyhexamethylene adipamide, polyhexamethylene sebacamide and polycaprolactam; acrylic resins, such as polymethylmethacrylate, polyacrylonitrile, polymethylacrylate, polyethylmethacrylate and styrene-methylmethacrylate or ethylene-methyl acrylate copolymers, ethylene-ethyl acrylate copolymers, ethylene-ethyl methacrylate copolymers, polystyrene and copolymers of styrene with unsaturated monomers mentioned above, cellulose derivatives, such as cellulose acetate, cellulose acetate butyrate, cellulose propionate, cellulose acetate propionate, and ethyl cellulose; polyesters such as polycarbonates; polyvinyl resins such as polyvinyl chloride, copolymers of vinyl chloride and vinyl acetate and polyvinyl butyral, polyvinyl alcohol, polyvinyl acetal, ethylene-vinyl acetate copolymers ethylene-vinyl alcohol copolymers, and ethylene-allyl copolymers such as ethylene-allyl alcohol copolymers, ethylene-allyl acetone copolymers, ethylene-allyl benzene copolymers ethylene-allyl ether copolymers, ethylene-acrylic copolymers and polyoxymethylene, polycondensation polymers, such as, polyesters, polyurethanes, polyamides and polycarbonates.

Useful solvents for the "polymer suspension" process are those that dissolve the polymer and which are also immiscible with water including, for example, chloromethane, dichloromethane, ethyl acetate, vinyl chloride, methyl ethyl ketone, trichloromethane, carbon tetrachloride, ethylene chloride, trichloroethane, toluene, xylene, cyclohexanone, 2-nitropropane and the like. A particularly useful solvent is dichloromethane because it is both a good solvent for many polymers while at the same time it is immiscible with water. Further, its volatility is such that it can be readily removed from the discontinuous phase droplets by evaporation.

In the "polymer suspension" process of this invention, the quantities of the various ingredients and their relationship to each other can vary over wide ranges, however, it has generally been found that the ratio of the polymer to the solvent should vary in an amount of from about 1 to about 80 percent, by weight, of combined weight of polymer and solvent and that the combined weight of the polymer in the solvent should vary with respect to the quantity of water employed in an amount of from about 25 to about 50 percent, by weight. Also the size and quantity of the solid colloidal stabilizer depends upon the size of the particles of the stabilizer and also upon the size of the polymer particles desired. Thus, as the size of the polymer/solvent droplets are made smaller by high shear agitation, the quantity of solid colloidal stabilizer is varied to prevent uncontrolled coalescence of the droplets and in order to achieve uniform size and narrow size distribution in the polymer particles that result.

Polymer particles having average diameters in the range of about 0.1 μm to about 150 μm, often from about 2 μm to about 30 μm can be prepared in accordance with the process of this invention. Such particles have a very narrow size distribution. Their coefficients of variation (ratio of the standard deviation to the average diameter) as described in U.S. Pat. No. 2,932,629, referenced previously herein, are normally in the range of about 15 to 35%.

As previously indicated herein, electrostatographic toners can be made using the process of their invention. Such toners and their use are well known but a description of the electrostatic imaging process and the toners used in that process at this point may be useful in understanding this feature of the invention.

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation op the strength of portions formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrostatographic toner that is in powder form. If desired, the latent image can be transferred to another surface before development.

One well-known type of electrostatographic developer comprises a dry mixture of toner particles and carrier particles. Developers of this type are commonly employed in well-known electrostatographic development processes such as cascade development and magnetic brush development. The particles in such developers are formulated such that the toner particles and carrier particles occupy different positions in the triboelectric continuum, so that when they contact each other during mixing to form the developer, they become triboelectrically charged, with the toner particles acquiring a charge of one polarity and the carrier particles acquiring a charge of the opposite polarity. These opposite charges attract each other such that the toner particles cling to the surfaces of the carrier particles. When the developer is brought into contact with the latent electrostatic image, the electrostatic forces of the latent image (sometimes in combination with an additional applied field) attract the toner particles, and the toner particles are pulled away from the carrier particles and become electrostatically attached imagewise to the latent image-bearing surface. The resultant toner image can then be fixed in place on the surface by application of heat or other known methods (depending upon the nature of the surface and of the toner image) or can be transferred to another surface, to which it then can be similarly fixed.

The toner particles can comprise any fixable polymer which has the physical properties required for a dry electrostatographic toner. By fixable is meant simply that the toner particles can be fixed or adhered to a receiving sheet such as paper or plastic. Useful toners are often thermally fixable to the receiving sheet. However, toners which are otherwise fixable, such as solvent-fixable, pressure-fixable or self-fixable, can be prepared in accordance with the invention. These fixing techniques and toners suitable for them are well-known in the art.

Many polymers have been reported in literature as being useful in dry electrostatographic toners. Depending upon the specific toner polymer desired, one can select the most appropriate technique, i.e., "suspension polymerization" or "polymer suspension", to be used in accordance with this invention. For example, polymers formed by addition polymerization are well suited to "suspension polymerization" while those formed by condensation polymerization are well suited to the "polymer suspension" technique. Polymers useful in toners include vinyl polymers, such as homopolymers and copolymers of styrene and condensation polymers such as polyesters and copolyesters. Especially useful toners are styrene polymers of from 40 to 100 percent by weight of styrene or styrene homologs and from 0 to 45 percent, by weight, of one or more lower alkyl acrylates or methacrylates. Fusible styrene-acrylic copolymers which are covalently lightly crosslinked with a divinyl compound such as divinylbenzene, as disclosed in the patent to Jadwin et al, U.S. Pat. No. Re 31,072, are useful. Also especially useful are polyesters of aromatic dicarboxylic acids with one or more aliphatic diols, such as polyesters of isophthalic or terephthalic acid with diols such as ethylene glycol, cyclohexane dimethanol and bisphenols. Examples are disclosed in the patent to Jadwin et al.

Fusible toner particles prepared according to this invention can have fusing temperatures in the range from about 50° C. to 200° C. so they can readily be fused to paper receiving sheets. preferred toners fuse in the range of from about 65° C. to 120° C. If the toner transfer is made to receiving sheets which can withstand higher temperatures, polymers op higher fusing temperatures can be used.

Toner particles prepared in accordance with this invention can simply comprise the polymeric particles but, it is often desirable to incorporate addenda in the toner such as waxes, colorants, release agents, charge control agents, and other toner addenda well known in the art. Where feasible, such addenda are added to the polymerizable monomer or polymer prior to their being suspended in aqueous medium.

If a colorless image is desired, it is not necessary to add colorant to the toner particles. However, more usually a visibly colored image is desired and suitable colorants selected from a wide variety of dyes and pigments such as disclosed for example, in Reissue U.S. Pat. No. 31,072 are used. A particularly useful colorant for toners to be used in black-and-white electrophotographic copying machines is carbon black. Colorants in the amount of from about 1 to about 30 percent, by weight, based on the weight of the toner can be used. Often from about 1 to 8 percent, by weight, of colorant is employed.

Charge control agents suitable for use in toners are disclosed for example in U.S. Pat. Nos. 3,893,935; 4,079,014; 4,323,634 and British Patent Nos. 1,501,065 and 1,420,839. Charge control agents are generally employed in small quantities such as, from about 0.1 to about 3, weight percent, and preferably prom about 0.2 to about 1.5 weight percent, based on the weight of the toner.

Toners prepared in accordance with this invention can be mixed with a carrier vehicle. The carrier vehicles, which can be used to form suitable developer compositions, can be selected from a variety of materials. Such materials include carrier core particles and core particles overcoated with a thin layer of film-forming resin.

The carrier core materials can comprise conductive, non-conductive, magnetic, or non-magnetic materials. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

As noted above, the carrier particles can be overcoated with a thin layer of a film-forming resin for the purpose of establishing the correct triboelectric relationship and charge level with the toner employed. Examples of suitable resins are described in U.S. Pat. Nos. 3,547,822; 3,632,512; 3,795,618; 3,898,170; 4,545,060; 4,478,925; 4,076,857; and 3,970,571.

A typical developer composition containing the above-described toner and a carrier vehicle generally comprises from about 1 to about 20 percent, by weight, of particulate toner particles and from about 80 to about 99 weight, by weight, carrier particles. Usually, the carrier particles are larger than the toner particles. Conventional carrier particles have a particle size on the order of from about 20 to about 1200 micrometers, generally about 30–300 micrometers.

Alternatively, the toners of the present invention can be used in a single component developer, i.e., with no carrier particles.

Toner particles prepared in accordance with this invention should generally have an average diameter in the range of from about 0.1 to 100 μm, a value of about 2 to about 20 μm being particularly useful in many current copy machines.

The following preparation techniques and examples further illustrate this invention.

The "average diameters" of the particles referred to in the following examples and elsewhere herein are diameters of median particles by volume, i.e., 50 percent of the total volume of the particles is made up of particles that each have a diameter greater than the reported value and 50 percent of the total volume of the particles is made up of particles that each have a diameter less than the reported value. The ranges for the diameters of the particles in the total volume are reported in the following examples and clearly illustrate the narrow distribution of polymer particles prepared according to this invention.

Preparation I-Copolymer Colloidal Stabilizer

The polymerization method employed was a conventional emulsion polymerization using an aqueous medium containing an emulsifying agent and a water soluble free radical initiator.

A composition was prepared of 2000 ml 4.5 grams sodium dodecylsulfate, 60 grams of a monomer mixture of 45% by weight, styrene, 30% by weight, 2-hydroxyethyl methacrylate, 15% by weight, methacrylic acid, and 10% by weight, ethylene dimethacrylate. The mixture was degassed with argon and 0.26 grams of ammonium persulfate was added. The mixture was polymerized at 90° C. for 2 hours. The resulting fine copolymer particles were filtered and the pH was adjusted to 7 using 0.1 N potassium hydroxide. The suspension was stirred with 10 grams of a mixed bed ion exchange resin (Amberlite MB-1 sold by Rohm & Haas) for one hour, filtered, and then diafiltered using a 1000 molecular weight cut off polysulfone membrane until all the surfactant was removed. The average diameter of the copolymer particles in water was 0.06 μm at pH10. For convenience, the latex of copolymer in water is used as a stabilizer without isolation of the copolymer.

Preparation II

This preparation illustrates the manufacture of additional copolymers useful as solid colloidal stabilizers in the practice of this invention. Like the colloidal stabilizer made in Preparation I, each of these copolymers provide polymer particles having the desired narrow size distribution. Therefore, only the stabilizer of Preparation I is used in the following examples to illustrate the invention since the results achieved are typical of those obtained with the solid colloidal stabilizers described in this Preparation II.

Copolymers having the following compositions (%, by weight) and useful as solid colloidal stabilizers in the practice of this invention, were prepared according to Preparation I:

TABLE I

| | 1 | 2 | 3 | 4 | 5 | 6 | 7* |
|---|---|---|---|---|---|---|---|
| styrene | 40 | 62 | 57 | 60 | 25 | 45 | 45 |
| 2-hydroxyethyl methacrylate | 30 | 30 | 30 | 15 | 30 | 30 | 30 |
| methacrylic acid | 20 | 5 | 10 | 15 | 15 | 15 | |
| ethylene dimethacrylate | 10 | 3 | 3 | 10 | 10 | 10 | 10 |
| butylacrylate | | | | | 20 | | |
| 4-vinyl pyridine | | | | | | | 15 |

*The preparation technique was identical to that used for the first six copolymers except that 4.8 g of hexadecyltrimethylammonium bromide was used instead of the 4.5 g of sodium dodecyl sulfate, the temperature was maintained at 80° C., and the initiator was 0.4 g of 2,2'-azobis(2-amidinopropane) hydrochloride instead of 0.26 g of ammonium persulfate. Also, the pH was not adjusted and the latex was not slurried with the ion exchange resin as in the other preparations.

EXAMPLE 1

A mixture of 50 grams of 75% by weight, styrene and 25% by weight, butylacrylate containing 0.5 grams of 2,2'-azobis (2,4-dimethylvaleronitrile), a free radical initiator was added under shear to 212 ml of water having a pH of 10 buffered with a citrate/phosphate buffer and containing 10 ml of a latex prepared according to Preparation I. The latex had a 3% solids content and a pH of 10, and the average particle diameter of the copolymer particles was 0.06 μm. The resulting dispersion also contained 2 ml of potassium dichromate (2.5% solids), a free radical scavanger. This dispersion was further homogenized in a microfluidizer at 40 psi and the suspended monomer droplets (6–9 μm diameter) was polymerized at 50° C. for 17 hours and then at 70° C. for 4 hours. The resulting polymer particles were filtered, washed with water, and dried. The average particle diameter was 9.64 μm in a range of 6 to 12 μm. As shown by the scanning electron micrograph in FIG. 1, the polymer particles comprise a core styrene-butylacrylate copolymer that is covered with a layer of the smaller copolymer stabilizer particles of Preparation I.

EXAMPLE 2

The procedure of Example 1 was repeated using three different polymerizable monomers or monomer mixture in place of the styrene-butyl acrylate mixture. The polymerizable monomers were as follows:

(A) methyl methacrylate (B) 90%, by weight, styrene and 10%, by weight, diethylaminoethyl methacrylate (C) 98%, by weight, styrene and 2%, by weight, methacrylic acid The resulting polymeric particles had average particle diameters as follows:

(A) 8 μm in a range of 3 to 12 μm
(B) 7 μm in a particle range of 3 to 11 μm
(C) 6 μm in a particle range of 3 to 9 μm.

It is obvious from the average particle diameters and ranges set forth in Example 1, and this Example, that the use of the colloidal stabilizer according to their invention provides polymer particles having a narrow size distribution.

EXAMPLE 3

The process of this invention can be used to prepare polymeric particles for electrostatographic toners. To illustrate, a mixture of 47 grams of 75%, by weight, styrene and 25% by weight, butylacrylate, 3 grams of a carbon powder (sold by Cabot Corp. under the trade designation "Regal 300"), 1 gram of a styrene-alkylene block copolymer carbon dispersant (sold by Shell Chemical Co. under the trade designation "Kraton 1652") and a charge agent was ball milled for two days. Using this mixture, the procedure of Example 1 was repeated with 1.3 grams of the initiator, 200 ml water buffered at pH10, 15 ml of latex prepared according to Preparation I and 2 ml of potassium dichromate. The resulting toner particles had an average particle diameter of 7.3 μm in a particle range of 5 to 11 μm.

An electrostatographic developer formed by mixing toner particles prepared in this Example with ferrite carrier particles thinly coated with fluorocarbon resin were tested for "throw-off" or dusting. In this test, the developer is placed in a magnetic brush developer station which is connected by way of a filter to a vacuum source. As the magnets of the brush rotate and agitate the developer, any toner which separates from the carrier is drawn off by the vacuum and collects on the filter. The weight of toner on the filter after a selected period of time shows the extent of dusting or "throw-off" of toner. To simulate long life developer behavior, the developer was tested under two different conditions:

(1) Fresh developer: the developer is prepared at an initial toner concentration of 5 weight percent and tested without prior use.
(2) Exercised developer: before testing the developer at 5 weight percent toner concentration is exercised for 5 minutes by tumbling in a glass bottle placed in the rotating magnetic field (2,000 rpm) of a magnetic brush developing station.

The results of the tests of these developer compositions which were subjected to the indicated conditions before being tested for throw-off in the magnetic brush, were as follows:

| Pre-test Condition of the Developer | Throw-Off (mg) |
|---|---|
| 1 | 0.7 |
| 2 | 0.01 |

These results show that after exercise of the developer, the toner throw-off with toners prepared according to the invention was substantially less. This indicates that the toner particles will maintain a relatively stable electrostatic charge during the development process and will not be thrown off or lost to the system. These same toner compositions were also measured for their charge to mass ratio after being triboelectrically charged in contact with the carrier. The measurements showed that the toners of the invention maintained relatively stable charge after 5 minutes of exercise. When used in a typical electrostatographic copying process, they produce sharp toner images and exhibit excellent transfer properties.

EXAMPLE 4

The "polymer suspension" process can be used in accordance with this invention to prepare polymeric particles for electrostatographic toners. To illustrate, dichloromethane (400 g) was poured into a 1000 ml container equipped with a magnetic stirrer. While stirring, 87 g of a styrene-butyl acrylate addition copolymer (sold by Hercules as "Piccotoner 1221") was added and allowed to dissolve completely in a tightly covered container. 16 g of a 50—50 weight mixture of a bis(phthalocyanylalumina)tetraphenyldisiloxane cyan pigment and poly(propylene terephthalate-co-glutarate) 85/15, weight percent, was then added and the solution was stirred overnight. Charge agent, 0.2 g of stearyl dimethyl benzyl ammonium chloride, (sold by Onyx Chemical Co. as "Ammonyx 4002"), was added and the solution was stirred for an additional 90 minutes. Then 1500 mls of a buffer and 75 mls of a latex of Preparation I (2.25% solids) were combined in a 3000 ml beaker.

The aqueous phase and the organic phase were homogenized in a high shear mixer. The sample was sized and collected in a 3000 ml beaker. Dichloromethane was then allowed to evaporate while stirring for 17 hours with a glass stir rod equipped with a 15 cm paddle stirrer set at 825 rpms.

The dispersion was poured into a 3000 ml three neck round bottom flask equipped as above with a glass stir rod and stirred at reduced pressure to evaporate residual dichloromethane (approximately 90 minutes).

The polymer particles were collected on a fritted funnel (12–20 μm) reslurried twice with distilled water until a neutral pH was reached, collected and dried. The particles had an average particle diameter of 6 μm in a range of 4 to 8 μm. They were useful as electrostatographic toner particles to produce sharp images and their transfer properties to a paper receiver were good.

EXAMPLE 5

A polyester toner was prepared using the "polymer suspension" process according to Example 4. The polymer suspension was prepared as follows: A 20%, by weight, solution in dichloromethane was prepared using poly(ethylene terephthalate-coglutarate), 85/15, weight %, containing 2% by weight, Rhodamine B triflate dye. The solution was dispersed in water containing 0.14% of the latex of Preparation I to form a dispersion containing 24%, by weight, of the polyester/dye solution. The particles were completely free of solvent after treatment for 17 hours as described in Example 4. These particles had an average particle diameter of 4.7 μm in a range of 3 to 5 μm and were useful electrostatographic toners.

EXAMPLE 6

The process of this invention can be used to change the surface characteristics of the polymer particles prepared by simply changing the composition of the copolymer stabilizer. This flexibility presents a significant advantage over prior art processes that use solid colloidal stabilizers such as silica. To illustrate this feature of the invention, the procedure of Example 1 was repeated using a cationic latex prepared according to Preparation II (Copolymer 7*) with 45%, by weight, styrene, 30%, by weight hydroxyethyl methacrylate, 15%, by weight, 4-vinyl pyridine and 10%, by weight, ethylene dimethacrlate. These particles were individually charged against a standard electrostatographic ferrite carrier coated with polyvinylidene fluoride as described in U.S. Pat. No. 4,546,060. The mean charge on all the particles was 111 microcoulombs/gram. In contrast, corresponding particles prepared with a latex comprising a copolymer of 45%, by weight, styrene, 30%, by weight, hydroxyethyl methacrylate, 15%, by weight, methacrylic acid and 10%, by weight, ethylene dimethacrylate were bicharged and exhibited low positive and negative charges that were barely measurable. Clearly, the substitution of the 4-vinylpyridine for the methacrylic acid groups in the stabilizer copolymer provided a significant change in the polymer particles prepared.

EXAMPLE 7

As previously indicated herein, electrostatographic toner particles prepared according to the process oF this invention exhibit excellent flow characteristics which is very desirable in dry toner particles. To illustrate this feature of the invention, toner particles prepared according to the process of this invention were compared with comparable commercially available toner particles and toner particles prepared in the presence of silica as the colloidal stabilizer where the silica was removed removed so the toner particles would have suitable charging properties. The following toners were used in the comparison:

1. Particles of commercially available toner sold by Eastman Kodak Co. as "Ektaprint Toner L".
2. Toner particles containing a cyan pigment were prepared according to the procedure of Example 1 using silica particles having an average particles diameter of 0.025 μm as the colloidal stabilizer. The silica particles were removed from the surface of the toner polymer by dissolution in a strongly basic aqueous solution of potassium hydroxide according to known prior art practice.
3. Toner particles prepared according to Example 4.

The following Table II provides flow properties, in numbers of seconds required for 2 grams of the toner to flow through a funnel having an exit orifice diameter of approximately 2.6 mm. A short flow time is desirable with dry powder toners, especially for toner replenishment, because it is necessary for the replenishment toner to flow smoothly and quickly into an exhausted developer. If the flow time is too long, there is inadequate replenishment and poor quality copies are obtained.

TABLE II

| Toner | Size (μm) | Flow Time (Sec.) |
|---|---|---|
| 1 | 8 | 28 |
| 1 | 4 | 120 |
| 2 | 2-8 | 120 |
| 3 | 5-7 | 7 |

Comparison of the above flow times clearly illustrates that toner particles prepared according to the process of this invention provide excellent flow properties in comparison to comparable prior art dry toner powders.

From the foregoing description, it can be seen that the process op this invention can be used where it is desirable to stabilize suspended polymerizable monomer or polymer droplets. The process of this invention is useful in preparing a variety of polymer particles having a narrow size distribution which particles are useful for making not only electrostatographic toners but also ceramics, carriers for use in electrostatic development, matte materials, bead spread layers, drug loaded beads, ion exchange resins, and other materials that require small particles of narrow size distribution.

This invention has been described in detail with particular reference to preferred embodiments thereof, but it will be understood that variations and modifications can be effected within the spirit and scope of the invention.

We claim:

1. Polymer particles having a core of polymer coated with a layer of smaller particles comprising a copolymer of
   (1) about 25 to about 80 percent by weight, based on total monomer weight, of an addition polymerizable nonionic oleophilic monomer;
   (2) about 5 to about 45 percent by weight, based on total monomer weight, of an addition polymerizable nonionic hydrophilic monomer;
   (3) about 1 to about 50 percent by weight, based on total monomer weight, of an addition polymerizable ionic monomer; and
   (4) 0 to about 20 percent by weight based on total monomer weight, of a crosslinking monomer having at least two addition polymerizable groups.

2. Polymer particles of claim 1, wherein said copolymer comprises about 35 to about 65 percent by weight of the nonionic oleophilic monomer, about 10 to about 35 percent by weight of the nonionic hydrophilic monomer, about 10 to about 25 percent by weight of the ionic monomer and about 4 to about 15 percent of the crosslinking monomer.

3. The polymer particles of claim 1, wherein the nonionic oleophilic monomer is styrene.

4. Polymer particles of claim 3, wherein the nonionic hydrophilic monomer is 2-hydroxyethyl methacrylate, the ionic monomer is methacrylic acid and the crosslinking monomer is ethylene dimethacrylate.

5. Polymer particles of claim 1, wherein the core polymer has an average diameter in the range of about 2 to about 20 micrometers and the copolymer particles have an average diameter in the range of about 0.01 to about 0.15 micrometer.

6. An electrostatographic toner comprising polymer particles according to claim 5.

7. An electrostatographic toner comprising polymer particles according to claim 1.

8. An electrostatographic toner of claim 7, wherein the core polymer is a polyester.

9. An electrostatographic toner of claim 7, wherein the core polymer is a styrene polymer having an average diameter of about 2 to about 20 micrometers and the smaller copolymer particles have an average diameter in the range of about 0.01 to about 1 micrometer.

* * * * *